United States Patent [19]
Steffens et al.

[11] Patent Number: 6,114,265
[45] Date of Patent: Sep. 5, 2000

[54] COMBUSTION CONTROL IN A FLUID CATALYTIC CRACKING REGENERATOR

[75] Inventors: Todd R. Steffens; Paul K. Ladwig, both of Randolph, N.J.

[73] Assignee: Exxon Research and Engineering Company, Florham Park, N.J.

[21] Appl. No.: 08/213,347

[22] Filed: Mar. 15, 1994

[51] Int. Cl.[7] ................................................ B01J 29/90
[52] U.S. Cl. ............................... 502/52; 502/38; 502/41; 502/42; 502/46; 502/48; 502/49; 502/514; 208/113
[58] Field of Search .................... 502/38, 41, 42, 502/52, 46, 48, 49, 514; 208/113, 164

[56] References Cited

U.S. PATENT DOCUMENTS

| | | | |
|---|---|---|---|
| 2,344,770 | 3/1944 | Gunness | 502/52 |
| 2,391,327 | 12/1945 | Mekler | 252/242 |
| 3,161,583 | 12/1964 | Pohlenz | 208/164 |
| 3,206,393 | 9/1965 | Pohlenz | 208/164 |
| 3,316,170 | 4/1967 | Stewart et al. | 208/164 |
| 4,217,243 | 8/1980 | Christie | 252/419 |
| 4,217,244 | 8/1980 | Montgomery | 252/419 |
| 4,243,517 | 1/1981 | Luckenbach | 208/164 |
| 4,243,518 | 1/1981 | Luckenbach | 208/164 |
| 4,354,957 | 10/1982 | Swindell et al. | 252/419 |
| 4,374,021 | 2/1983 | Bartholic | 208/251 |
| 4,440,725 | 4/1984 | Swindell et al. | 422/62 |
| 4,849,091 | 7/1989 | Cabrera et al. | 208/113 |
| 4,965,232 | 10/1990 | Mauleon et al. | 502/43 |

*Primary Examiner*—Walter D. Griffin
*Attorney, Agent, or Firm*—Henry E. Naylor

[57] ABSTRACT

Disclosed is a process for controlling combustion in a fluid catalytic cracking regenerator. More specifically, afterburning which occurs during the combustion process is controlled by adjusting oxygen concentration in at least one of two combustion streams which is injected into a fluid catalytic cracking regenerator. Preferably, the combustion streams used in the invention are asymmetrically injected into a dense phase catalyst bed within the regenerator.

15 Claims, 2 Drawing Sheets

6,114,265

COMBUSTION CONTROL IN A FLUID CATALYTIC CRACKING REGENERATOR

FIELD OF THE INVENTION

This invention is directed to a process for controlling combustion in a fluid catalytic cracking regenerator. More specifically, afterburning which occurs during the combustion process is controlled by adjusting oxygen concentration in at least one of two combustion streams which is injected into a fluid catalytic cracking regenerator.

BACKGROUND OF THE INVENTION

Hydrocarbon cracking is a term which is well known in the art of petroleum refining and generally refers to the cracking of a large hydrocarbon molecule to a smaller hydrocarbon molecule by breaking at least one carbon to carbon bond. For example, a large paraffin molecule can be cracked into a paraffin and an olefin, and a large olefin molecule can be cracked into two or more smaller olefin molecules. The cracking reaction can also involve the opening of at least one ring of a multi-ring aromatic compound, as well as the cracking of long side chain molecules which may be present on single or multi-ring aromatic compounds.

As known in the art, fluid catalytic cracking is a hydrocarbon cracking process in which vaporized hydrocarbon feed is cracked in the presence of microsperoidal catalyst particles. The catalyst particles are maintained in a fluidized state in the reactor by the vaporized feed, and the fluidized state is enhanced by the addition of steam or a refinery gas stream.

As the catalytic cracking reaction is carried out, the active catalytic cracking catalyst becomes coked (i.e., coated with a carbonaceous material). The activity of the catalytic cracking catalyst decreases as the concentration of the coke deposited on the catalyst increases. Eventually, the catalytic cracking catalyst is deactivated to the point where the catalyst is essentially ineffective in enhancing the equilibrium balance of the cracking reaction under the standard cracking conditions. At this point, the catalytic cracking catalyst is considered to be a deactivated (i.e., spent) cracking catalyst.

Typically, the spent catalyst is regenerated by combusting the coke from the spent catalyst. In order to regenerate the catalyst, oxygen is injected into the regenerator section of the catalytic cracking unit. In the presence of a stoichiometric amount of oxygen, carbon dioxide will be largely present as the carbon combustion product. However, carbon monoxide can also form during the combustion process, and if there is available oxygen, the carbon monoxide can further combust to form carbon dioxide. If this additional combustion occurs in regions of relatively low catalyst density zones, undesirable regions of excess heat can form. This phenomenon is commonly referred to as afterburning. Afterburning is undesirable in that it can lead to a thermal deactivation of the catalyst, an improper regeneration of the spent catalyst, or mechanical damage to the interior of the regenerator vessel.

U.S. Pat. No. 4,849,091 discloses the monitoring of afterburning in a two stage regenerator in order to control dense bed catalyst regeneration. By measuring the temperature of a dense bed catalyst zone, the regeneration gas leaving the dense bed zone, the regeneration gas leaving the riser regeneration zone, or the two regeneration gas streams at the point of initial mixing, and comparing it to the temperature of the combined regeneration gas at a downstream location such as the upper portion of the disengagement space or spent regeneration gas outlet, the resulting differential temperature will indicate the occurrence of afterburning in the upper disengaging zone and, therefore, the presence of oxygen in the disengagement zone. The differential temperature is automatically controlled using a controller to increase or decrease the total amount of oxygen input to the dense catalyst bed.

U.S. Pat. No. 4,354,957 discloses a control system for controlling temperature in the regenerator section of a catalytic cracking unit. The control system uses two input signals to generate one control signal. One of the signals indicates the carbon monoxide content in the overhead gas portion of the regenerator. The other signal indicates the temperature of the gas in the overhead. A computer controller uses these two signals to generate an output signal which controls the total amount of air input into the regenerator.

Although there has been improvement in controlling afterburning as well as controlling the overall temperature within the regenerator section of fluid catalytic cracking units, many problems still exist. Afterburning and overall temperature control could be more effectively controlled, for example, by achieving a controlled distribution of oxygen within the dense phase catalyst bed of the regenerator.

SUMMARY OF THE INVENTION

This invention overcomes many of the problems inherent in the prior art by providing a process for controlling afterburning in a fluid catalytic cracking regenerator, which comprises providing a catalyst bed in the fluid catalytic cracking regenerator; providing a regenerator vapor region above the catalyst bed; injecting a first and second combustion stream into the catalyst bed, wherein the first and second combustion streams are spaced apart from one another; taking a temperature measurement in the catalyst bed; taking a temperature measurement in the regenerator vapor region; calculating the difference between the temperature of the catalyst bed and the temperature of the vapor region of the fluid catalytic cracking regenerator as $\Delta T$; and increasing oxygen concentration in one of the first and second combustion streams, when $\Delta T$ has an absolute value that is greater than a predetermined value, until the absolute value of $\Delta T$ is less than or equal to the predetermined value.

In another preferred embodiment the invention provides for a process for controlling afterburning in a fluid catalytic cracking regenerator, which comprises providing a catalyst bed in the fluid catalytic cracking regenerator; providing a regenerator vapor region above the catalyst bed; injecting a first and second combustion stream into the catalyst bed, wherein the first and second combustion streams are spaced apart from one another; taking a temperature measurement in at least two separate locations within the vapor regenerator region; calculating the difference between the temperature measurement of each location within the vapor regeneration region as $\Delta T$; and increasing oxygen concentration in one of the first and second combustion streams, when $\Delta T$ has an absolute value that is greater than a predetermined value, until the absolute value of $\Delta T$ is less than or equal to the predetermined value.

In yet another embodiment of the invention, it is preferred that the catalyst bed is a dense phase catalyst bed. More preferably, the dense phase catalyst bed has a density of 10–50 lbs/ft$^3$ (160–800 kg/m$^3$).

In the invention, it is also preferred that the first and second combustion streams are asymmetrically spaced apart from one another and injected into the catalyst bed. More preferably, the first combustion stream is symmetrically injected into the catalyst bed and the second stream is asymmetrically injected into the catalyst bed.

It is further preferred that in the temperature measuring step of the process of this invention, that the temperature of the vapor region is taken at a point selected from the group consisting of a regenerator overhead region, a primary cyclone inlet and a secondary cyclone inlet. In setting a predetermined temperature differential, it is preferred that the absolute value of ΔT be less than about 100° F. (56° C.).

BRIEF DESCRIPTION OF THE DRAWINGS

The present invention will be better understood by reference to the Detailed Description of the Invention when taken together with the attached drawings, wherein.

DETAILED DESCRIPTION OF THE INVENTION

Figure 1:
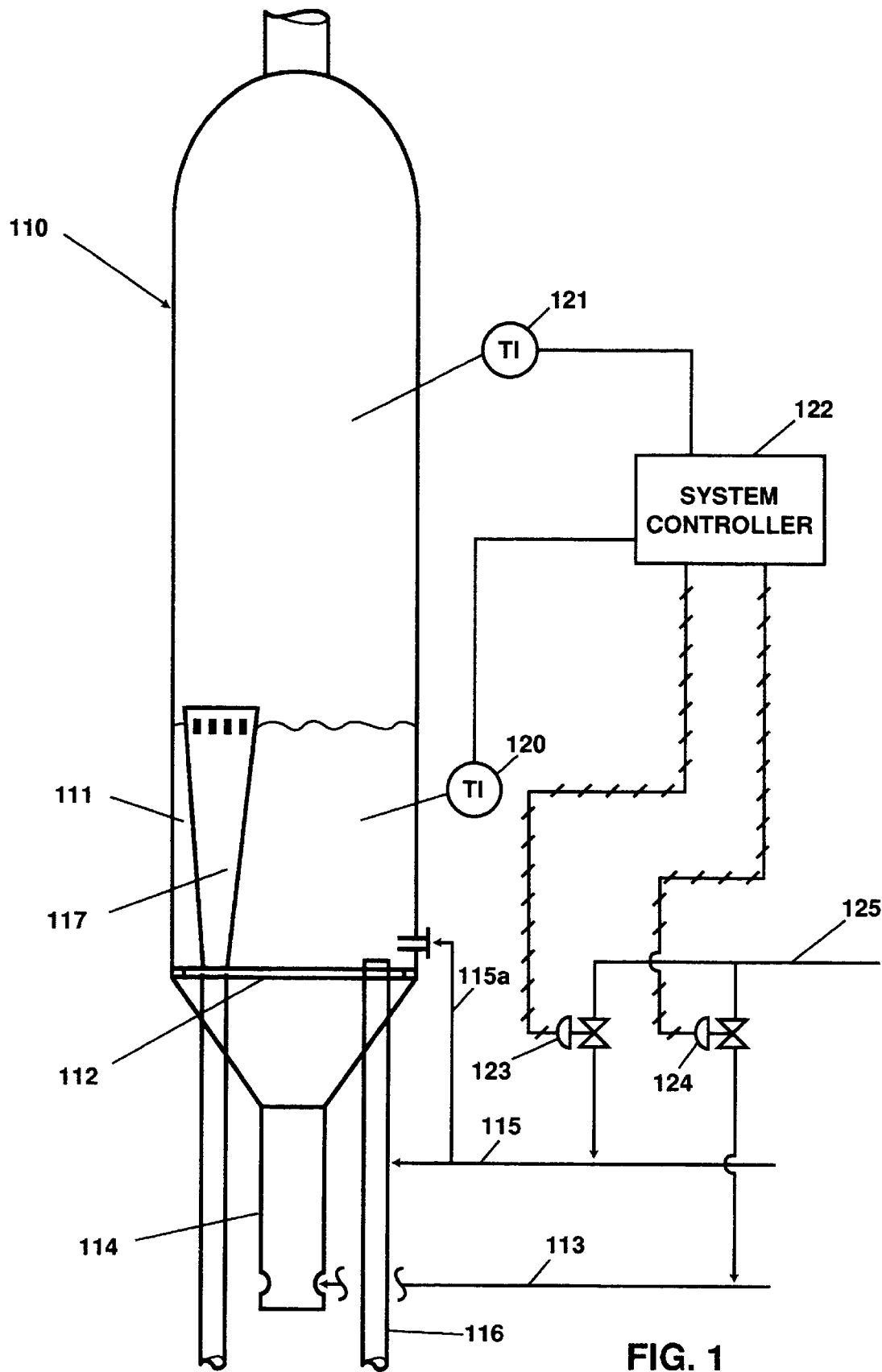
FIG. 1 shows one embodiment of this invention in which the absolute value of ΔT between the catalyst bed and one point in the regenerator vapor region is used to determine the optimum radial combustion profile in the catalyst bed.

It has been found that afterburning and overall temperature within a fluid catalytic cracking regenerator can be controlled by controlling the distribution of oxygen within a bed of catalytic cracking catalyst. By controlling oxygen distribution within the bed, there will be little if any excess oxygen to form carbon dioxide from any carbon monoxide which may be present.

The catalyst which is used in this invention is any catalyst which is typically used to catalytically crack hydrocarbon feeds. It is preferred that the catalytic cracking catalyst be a zeolite-containing catalyst. More preferably, the zeolite catalyst will be a high activity crystalline zeolite catalyst. High activity crystalline zeolite catalysts are well known in the art.

Zeolites which can be employed in accordance with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Included among the synthetic zeolites are zeolites X, Y, A, L, ZK-4, ZK-5, B, E, F, H, J, M, Q, T, W, Z, alpha and beta, ZSM-types and omega.

In general, aluminosilicate zeolites are effectively used in this invention. However, the aluminum as well as the silicon component can be substituted for other framework components. For example, the aluminum portion can be replaced by boron, gallium, titanium or trivalent metal compositions which are heavier than aluminum. Germanium can be used to replace the silicon portion.

In this invention, as well as in typical catalytic cracking processes, the hydrocarbon feed is preferably a petroleum hydrocarbon. The hydrocarbon is preferably a distillate fraction having an initial ASTM boiling point of 400° F. (200° C.), preferably 650° F. (345° C.). Such hydrocarbon fractions include gas oils, thermal oils, residual oils, cycle stocks, whole and topped crudes, tar sand oils, shale oils, synthetic fuels, heavy hydrocarbon fractions derived from the destructive hydrogenation of coal, tar, pitches, asphalts, and hydrotreated or solvent separated (e.g., DAO) feed stocks derived from any of the foregoing.

The regeneration process takes place at a temperature that is generally higher than the cracking reaction. In the regenerator, coke is burned from the catalyst using a combustion stream. The heat of combustion raises the temperature of the catalyst to about 900–1500° F. (480–820° C.). Preferably, the regenerated catalyst contains less than about 0.4 wt % coke, more preferably less than about 0.1 wt % coke. It is also preferable that catalyst regeneration take place at a pressure of about 0–100 psig (0–700 kPa), more preferably about 5–50 psig (40–400 kPa).

The combustion stream of this invention is preferably any fluid stream which includes oxygen as the primary combustion medium. Preferably, the oxygen content of the combustion stream ranges from about 21–40 wt %, more preferably about 21–28 wt %. In one of the preferred embodiments, the combustion stream is supplied by an air source, and the concentration of the oxygen in the combustion stream is augmented by oxygen input from a concentrated oxygen supply source.

In this invention, a preferred method of controlling afterburning involves measuring the temperature within the dense phase catalyst bed and at least one location in the vapor region. The vapor region, as used herein, is considered any region within the regenerator that is not included in the dense phase catalyst bed. Included in the regenerator vapor region is the dilute phase region and the regenerator overhead region, which also includes the regenerator cyclone region, the plenum chamber, and the regenerator overhead line.

The dilute phase region includes, inter alia, a small amount of unreacted hydrocarbon, $NH_3$, $H_2S$ and catalyst. Preferably, the components of the dilute phase region have a total density that is between the density of the vapor components of the medium and about 10 lbs/ft$^3$ (160 kg/m$^2$). It is more preferred that the components of the dilute phase region have a density of 0.25–4 lbs/ft$^3$ (4–64 kg/m$^3$), most preferably 0.5–1.5 lbs/ft$^3$ (8–24 kg/m$^3$).

The dense phase catalyst bed is that region, generally in the lower region of the regenerator, where the primary combustion of the carbon residue on the spent catalyst is intended to occur, having significant concentration of catalyst in relatively intimate contact with the combustion stream. The density of the dense phase catalyst bed is generally greater than that of the dilute phase region, but there is not a specific density level which is understood to clearly distinguish the catalyst density of a dense phase catalyst bed from that of the catalyst density of a dilute phase region. For purposes of describing this invention, however, a general distinction between the two densities has been set at 10 lbs/ft$^3$ (160 kg/m$^3$), with the preferred designation of catalyst density in the dense phase catalyst bed being between 10 and 50 lbs/ft$^3$ (160 and 800 kg/m$^3$). More preferably, the dense phase catalyst bed has a density of 15–40 lbs/ft$^3$ (240–640 kg/m$^3$), most preferably 20–30 lbs/ft$^3$ (320–480 kg/m$^3$).

After measuring the temperature in the appropriate regions of the regenerator, the difference between the temperature of the dense phase catalyst bed and the temperature of the vapor region of the regenerator, or between two locations in the vapor region, is calculated. This difference is called ΔT. When ΔT has an absolute value that is less than a predetermined value, the oxygen concentration across the catalyst bed is balanced so that combustion of the coke in the catalyst bed is evenly distributed throughout. Oxygen concentration across the catalyst bed is balanced by adjusting the oxygen content input to the catalyst bed in at least one of two different combustion streams.

Non-symmetric combustion across the catalyst bed can be the result of various imbalances in the combustion process. One way in which non-symmetric combustion occurs is due to the inherent design characteristics of an asymmetric regenerator where spent catalyst is introduced to the regenerator through an asymmetrically located spent catalyst inlet riser at one side of the regenerator, and regenerated catalyst is removed through an asymmetrically located regenerator catalyst standpipe outlet at an opposite side of the regenerator. In this type of arrangement, spent catalyst is at a higher overall concentration on the catalyst inlet side of the regenerator relative to the catalyst outlet side of the regenerator. On the catalyst inlet side of the regenerator, the oxygen that is injected into the regenerator to combust the coke on the spent catalyst, will be depleted at a much faster rate than on the outlet side of the regenerator. This leads to an imbalance in oxygen across the catalyst bed, resulting in zones which are oxygen rich or carbon monoxide rich in comparison. If the carbon monoxide in the carbon monoxide rich zone contacts free oxygen, afterburning will occur. By using the method of this invention, temperature is monitored to control afterburning in the catalyst bed.

A preferred embodiment of this invention is described with reference to FIG. 1, which shows a fluid catalytic cracking regenerator 110 having a dense phase catalyst bed 111, supported by an internal framework 112. The internal framework 112 is typically a grid member which has multiple holes through which a combustion stream can flow, although other means such as a pipe grid distributor can be used. The combustion stream flowing through the framework 112 is used to combust coke from the catalyst in the dense phase catalyst bed 111 as well as keep the dense phase catalyst bed 111 in a fluid state.

According to this invention, a combustion medium is injected into the dense phase catalyst bed 111 through at least two different streams. In a first combustion stream 113, a combustion medium is injected into the bottom of the regenerator 114. The combustion stream 113 flows up through the internal framework 112 and contacts the catalyst in the dense phase catalyst bed 111. In a preferred embodiment, the first combustion stream 113 is symmetrically injected into the dense phase catalyst bed 111.

In order to control afterburning during the combustion process, at least one additional combustion stream is injected into the dense phase catalyst bed 111. To effectively control the afterburning process, the additional combustion stream is injected into the dense phase catalyst bed 111 apart from any other combustion streams which are injected into the dense phase catalyst bed 111. This additional input is exemplified in FIG. 1 in which a second combustion stream 115 is injected at a location apart from the first combustion stream 113. If the regenerator has a catalyst effluent riser that is asymmetrically located within the dense phase catalyst bed 111, then the second combustion stream 115 will be injected into the dense phase catalyst bed 111 in an asymmetric position.

Preferably, as shown in FIG. 1, a spent catalyst input riser 116 is located in an oppositely oriented, asymmetric position with respect to a catalyst effluent standpipe 117, and the second combustion stream 115 is injected into the dense phase catalyst bed 111 along with the spent catalyst. This preferred embodiment for injecting the second combustion stream 115 is also beneficial in that the secondary combustion stream 115 will act as a fluidizing medium. The secondary combustion stream can be introduced, however, in close proximity to where the spent catalyst is introduced into the regenerator. For example, a combustion medium can be injected with a sparger 115a at a location that is in close proximity to the inlet riser.

In the embodiment shown in FIG. 1, afterburning is controlled by balancing the concentration of oxygen in the combustion streams. The oxygen concentration is balanced in the combustion streams by minimizing the difference in temperature between the catalyst bed and at least one point in the regenerator vapor region. For example, the temperature in the dense phase catalyst bed 111 is measured using a temperature indicator 120, and the temperature in the regenerator vapor region is measured using a temperature indicator 121. The difference between the two temperatures is calculated as $\Delta T$, and the absolute value of $\Delta T$ is stored in system controller 122. When the absolute value of $\Delta T$ is greater than a predetermined value, which is also stored in the system controller 122, a signal is sent from the system controller 122 to one of a series of flow control valves 123, 124 to send oxygen from an oxygen supply line 125 to either the first combustion stream 113 or the second combustion stream 115. After increasing the oxygen concentration of one of the combustion streams, the absolute value of $\Delta T$ is then recalculated. If the absolute value of $\Delta T$ decreases, then the concentration of oxygen can be increased in the same combustion stream in as many iterations as necessary until the absolute value of $\Delta T$ is within the desired, predetermined range. Preferably, the absolute value of $\Delta T$ will be less than about 100° F. ($\Delta T \sim 56°$ C.), more preferably about 50° F. ($\Delta T \sim 28°$ C.), most preferably about 25° F. ($\Delta T \sim 14°$ C.).

If the absolute value of $\Delta T$ increases as a result of increasing one of the combustion streams, the system controller 122 will be programmed to repeat the original mode of operation, but increasing the concentration of oxygen in the other combustion stream to achieve a subsequent decrease in the absolute value of $\Delta T$. Program controls and iterative calculations which can be used in the process of this invention are well known and can be incorporated into the system controller 122.

Iterative calculations which are particularly useful in achieving the desired absolute value of $\Delta T$ include classical feedback control techniques relating $\Delta T$ and % control valve opening. Specific examples of such calculation techniques are Proportional plus Integral or, more preferably, Proportional plus Integral plus Derivative Control, relating the response of the $\Delta T$ to the distribution of oxygen amongst the combustion streams by use of a transfer function where the controller output is proportional to both the magnitude of the error and the rate of change of the error.

Figure 2:
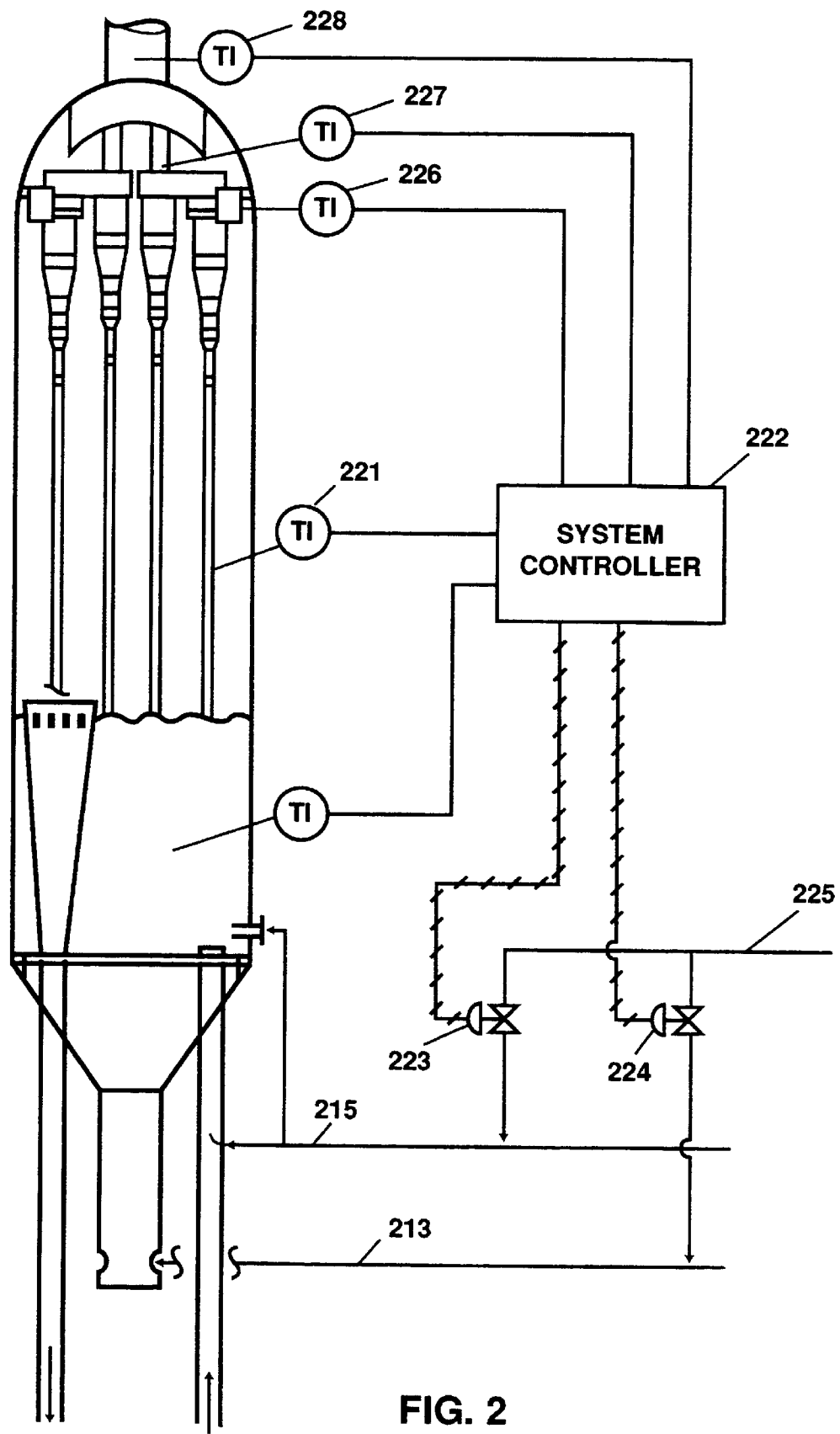
FIG. 2 shows another embodiment of this invention in which more than one point within the regenerator vapor region is used to determine the optimum radial combustion profile in the catalyst bed.

Another embodiment of this invention is shown in FIG. 2, in which the oxygen concentration is balanced in the combustion streams by minimizing the difference in temperature between at least two temperature points in the regenerator vapor region. The temperature in these areas can be measured using a dilute phase temperature indicator 221, a cyclone inlet temperature indicator 226, a cyclone outlet temperature indicator 227, and an overhead temperature indicator 228, respectively.

As an example of one preferred embodiment, the temperature in the regenerator vapor region is measured using the cyclone inlet temperature indicator 226 and the cyclone outlet temperature indicator 227. The difference between the two temperatures is calculated as $\Delta T$, and the absolute value of $\Delta T$ is stored in a system controller 222. When the absolute value of $\Delta T$ is greater than a predetermined value, which is also stored in the system controller 222, a signal is sent from the system controller 222 to one of at least two flow control valves 223, 224 to send oxygen from an oxygen supply line 225 to either a first combustion stream 213 or a second combustion stream 215. After increasing the oxygen concentration of one of the combustion streams, the absolute value of ΔT is then recalculated. If the absolute value of ΔT decreases, then the concentration of oxygen can be increased in the same combustion stream in as many iterations as necessary until the absolute value of ΔT is within the desired, predetermined range. Preferably, the absolute value of ΔT will be less than about 100° F. (ΔT~56° C.), more preferably about 50° F. (ΔT~28° C.), most preferably about 25° F. (ΔT~14° C.).

If the absolute value of ΔT increases as a result of increasing the oxygen to one of the combustion streams, the system controller 222 will be programmed to repeat the original mode of operation, but increasing the concentration of oxygen in the other combustion stream to achieve a subsequent decrease in the absolute value of ΔT. Program controls and calculations which can be used in the process of this invention are well known and can be incorporated into the system controller 222. Iterative calculations which are particularly useful in achieving the desired absolute value of ΔT include classical feedback control techniques relating ΔT and % control valve opening. Specific examples of such calculation techniques are Proportional plus Integral or, more preferably, Proportional plus Integral plus Derivative Control, relating the response of the ΔT to the distribution of oxygen amongst the combustion streams by use of a transfer function where the controller output is proportional to both the magnitude of the error and the rate of change of the error.

Having now fully described this invention, it will be appreciated by those skilled in the art that the invention can be performed within a wide range of parameters within what is claimed:

What is claimed is:

1. A process for controlling afterburning in a fluid catalytic cracking regenerator, comprising:
    providing a catalyst bed in the fluid catalytic cracking regenerator;
    providing a regenerator vapor region above the catalyst bed;
    injecting a first and second stream of air into the catalyst bed, wherein the first and second streams of air are spaced apart from one another;
    taking a temperature measurement in the catalyst bed;
    taking a temperature measurement in the regenerator vapor region;
    calculating the difference between the temperature of the catalyst bed and the temperature of the vapor region of the fluid catalytic cracking regenerator as ΔT; and
    increasing oxygen concentration in one of the first and second streams of air, when ΔT has an absolute value that is greater than a predetermined value, until the absolute value of ΔT is less than or equal to the predetermined value.

2. The process of claim 1, wherein the catalyst bed is a dense phase catalyst bed.

3. The process of claim 2, wherein the dense phase catalyst bed has a density of 10–50 lbs/ft$^3$ (160–800 kg/m$^3$).

4. The process of claim 1, wherein the first and second streams of air are asymmetrically spaced apart from one another and injected into the catalyst bed.

5. The process of claim 1, wherein the temperature of the vapor region is taken at a point selected from the group consisting of a regenerator overhead region, a primary cyclone inlet and a secondary cyclone inlet.

6. The process of claim 1, wherein the predetermined absolute value of ΔT is less than about 100° F. (56° C.).

7. The process of claim 1, wherein the first stream of air is symmetrically injected into the catalyst bed and the second stream of air is asymmetrically injected into the catalyst bed.

8. The process of claim 7, wherein the second stream of air is injected into the catalyst bed with a spent catalyst stream.

9. A process for controlling afterburning in a fluid catalytic cracking regenerator, comprising:
    providing a catalyst bed in the fluid catalytic cracking regenerator;
    providing a regenerator vapor region above the catalyst bed;
    injecting a first and second stream of air into the catalyst bed, wherein the first and second combustion streams are spaced apart from one another;
    taking a temperature measurement in at least two separate locations within the regenerator vapor region;
    calculating the difference between the temperature measurement of each location within the regenerator vapor region as ΔT; and
    increasing oxygen concentration in one of the first and second streams of air, when ΔT has an absolute value that is greater than a predetermined value, until the absolute value of ΔT is less than or equal to the predetermined value.

10. The process of claim 9, wherein the catalyst bed is a dense phase catalyst bed.

11. The process of claim 10, wherein the dense phase catalyst bed has a density of 10–50 lbs/ft$^3$ (160–800 kg/m$^3$).

12. The process of claim 9, wherein the first and second streams of air are asymmetrically spaced apart from one another.

13. The process of claim 9, wherein the predetermined absolute value of ΔT is less than about 100° F. (56° C.).

14. The process of claim 9, wherein the first stream of air is symmetrically injected into the catalyst bed and the second stream of air is asymmetrically injected into the catalyst bed.

15. The process of claim 9, wherein the second stream of air is injected into the catalyst bed with a spent catalyst stream.

* * * * *